United States Patent [19]  [11] 4,389,520
Gannon  [45] Jun. 21, 1983

[54] ADVANCEMENT CATALYSTS FOR EPOXY RESINS

[75] Inventor: John A. Gannon, Danbury, Conn.

[73] Assignee: Ciba-Geigy Corporation, Ardsley, N.Y.

[21] Appl. No.: 365,729

[22] Filed: Apr. 5, 1982

[51] Int. Cl.³ .................... C08G 59/62; C08G 59/68
[52] U.S. Cl. .................... 528/89; 252/182; 528/104
[58] Field of Search .............. 528/89, 104; 252/182

[56] References Cited

U.S. PATENT DOCUMENTS

| 3,477,990 | 11/1969 | Dante et al. | 528/104 X |
|---|---|---|---|
| 3,547,885 | 12/1970 | Dante et al. | 528/89 |
| 3,843,605 | 10/1974 | Schmidt et al. | 528/89 |
| 3,948,855 | 4/1976 | Perry | 528/89 |
| 4,048,141 | 9/1977 | Doorakian et al. | 528/89 |
| 4,131,633 | 12/1978 | Doorakian et al. | 528/89 X |
| 4,132,706 | 1/1979 | Doorakian et al. | 528/104 X |
| 4,302,574 | 11/1981 | Doorakian et al. | 528/89 |
| 4,352,918 | 10/1982 | Whiteside et al. | 528/89 |

FOREIGN PATENT DOCUMENTS 1398197 6/1975 United Kingdom .

Primary Examiner—Earl A. Nielsen
Attorney, Agent, or Firm—Luther A. R. Hall

[57] ABSTRACT

Advancement catalysts selected from the group consisting of formylmethylenetriphenylphosphorane and its phosphonium halide salt precursors, e.g., formylmethyltriphenylphosphonium chloride, confer high reactivity and selectivity on epoxy resin advancement reactions. Advanced epoxy resins are useful in the perparation of coatings of high quality.

8 Claims, No Drawings

ADVANCEMENT CATALYSTS FOR EPOXY RESINS

BACKGROUND OF THE INVENTION

This invention pertains to selective latent catalysts showing high selectivity and reactivity in advancing liquid epoxy resins to high molecular weight, essentially unbranched epoxy resins which are solid at room temperature.

The instant process comprises reacting together, in the presence of a catalyst, an epoxy liquid resin which contains more than one epoxy group, preferably two, and a phenol containing at least two hydroxyl groups. The reaction proceeds as a step-growth polymerization process and has been termed a fusion or advancement process.

An important property of the catalyst in advancement processing is the selectivity conferred on the phenolic hydroxyl-epoxide reaction. Highly selective catalysis ensures the production of linear polyhydroxyethers and is the highly desired result. Poor selectivity allows the aliphatic hydroxyl group, generated upon opening of the oxirane ring, to react with an epoxy group:

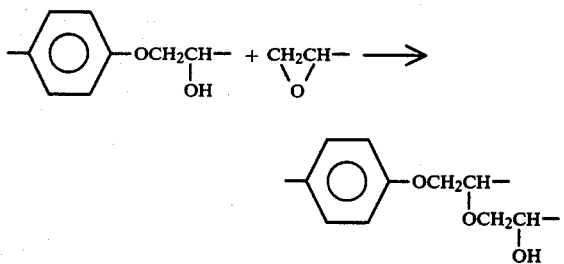

The resultant polymer in the latter case is branched or crosslinked and is deficient in chain flexibility.

Along with the forementioned selectivity, advancement catalysts should be sufficiently reactive to enable "linear" solid advanced epoxy resins of high molecular weight to be formed at economically attractive rates. High reaction rates are accompanied by large exotherms due to opening of the epoxy ring and the liberated heat serves to sustain the rapid attainment of a higher molecular weight product.

Many compounds have been suggested or described as catalysts for the advancement of liquid epoxy resins. However, some are not selective causing the aforementioned branching or crosslinking to occur while others are ineffective in promoting the highly exothermic advancement reactions at practical rates to obtain a satisfactorily advanced linear solid epoxy resin.

Phosphonium halide catalysts, such as methyl or ethyl triphenylphosphonium iodide or bromide, are described in U.S. Pat. Nos. 3,447,990 and 3,547,885.

Organic phosphine catalysts, such as triphenylphosphine or tributylphosphine, are disclosed in U.S. Pat. No. 3,547,881.

Phosphonium salts of carboxylic acids, such as ethyltriphenylphosphonium acetate or its acetic acid complex or phosphonium phosphate esters, are described in U.S. Pat. No. 3,948,855.

Phosphorus containing catalysts which are the reaction products of trihydrocarbyl phosphines with maleic anhydride and the hydrolyzed derivatives thereof are disclosed in U.S. Pat. Nos. 4,048,141 and 4,131,633.

Trisubstituted (2,5-dihydroxyphenyl)phosphonium hydroxide inner salts are described as catalysts in U.S. Pat. No. 4,132,706.

Alkylene phosphoranes of the general formula

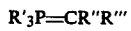

wherein each of the groups represented by R' may be the same or different and is an aromatic hydrocarbon group, preferably phenyl, and, R" and R"' represent a hydrogen atom, a carbonyl group, a carboxylic acid ester or carboxylic acid amide, a hydrocarbon group that contains up to 20 carbon atoms and may be substituted by one or more groups selected from carbonyl groups, carboxylic acid ester groups and carboxylic acid amide groups and/or which may form a ring are described in British Pat. No. 1,398,197. These catalysts are described as being more selective than previously proposed catalysts such as alkali or substances having alkaline properties i.e., amines, quaternary ammonium compounds, or a salt such as sodium acetate. Moreover, the phosphoranes are said to be more effective in promoting acceptable reaction rates than the latter group of catalysts.

The use of similar phosphorous-containing compounds, such as the alkylene phosphoranes and phosphonium halides, are also mentioned in German Offen. No. 2,643,336 (=CA, 87, 54629b (1977)) and British Pat. No. 1,485,345 as catalysts in the so-called "Taffy" process of preparing higher molecular weight solid resins directly from polyphenols and epichlorohydrin/caustic.

SUMMARY OF THE INVENTION

The instant invention pertains to a precatalyzed epoxy resin composition comprising (a) a liquid epoxy resin bearing an average of more than one vicinal epoxy group per molecule, and (b) a small, but effective catalytic amount of formylmethylenetriphenylphosphorane or formylmethyltriphenylphosphonium halide, preferably chloride.

The invention also includes a precatalyzed epoxy resin composition which additionally comprises (c) a bisphenol, with (b) being present in an amount sufficient to catalyze the advancement reaction between (a) and (c) when the reaction mixture is heated to a temperature of from about 50° C. to about 225° C.

Preferably the epoxy resin (a) is the diglycidyl ether of bisphenol A, namely 2,2-bis[p-(glycidyloxy)phenyl]-propane, and the bisphenol is bisphenol A, namely 4,4'-isopropylidenediphenol.

Another aspect of the instant invention relates to an improved process for advancing a liquid epoxy resin bearing at least one vicinal epoxy, preferably two such groups, with a polyphenol, preferably a bisphenol, to form a solid, essentially linear resin at about 50° C. to about 225° C. wherein the improvement comprises carrying out the advancement reaction in the presence of a small, but effective catalytic amount of formylmethylenetriphenylphosphorane or formylmethyltriphenylphosphonium halide, preferably chloride.

While many potential advancement catalysts have proven unsatisfactory, some selected compounds such as ethyltriphenylphosphonium iodide (U.S. Pat. Nos. 3,477,990 and 3,547,855) and ethyltriphenylphosphonium acetate-acetic acid complex (U.S. Pat. No.

3,948,855) exhibits sufficient selectivity and reactivity to serve as advancement catalysts in liquid epoxy resins in some commercial epoxy resin systems.

The instant catalysts, formylmethylenetriphenylphosphorane and formylmethyltriphenylphosphonium halide, eg chloride, iodide or bromide, preferably chloride, provide excellent selectivity and reactivity in the advancement reaction.

Additionally, the instant catalysts are distinguished over the two above named catalysts in several important features. The instant catalysts provide better storage stability to precatalyzed liquid resin compositions than does the ethyltriphenylphosphonium acetate-acetic acid complex catalyst.

The instant catalysts are surprisingly less sensitive to deactivation by heat than are the ethyltriphenylphosphonium iodide and ethyltriphenylphosphonium acetate-acetic acid complex catalysts. This resistance to deactivation permits the use of the instant catalysts at higher temperatures in the epoxy resin advancement reactions with the concomitant economic advantages of obtaining acceptable advanced resins in perceptibly shorter reaction times.

The instant catalysts provide an unexpectedly superior balance of properties, namely excellent selectivity and reactivity in the advancement reaction; good storage stability for precatalyzed resin compositions, combined with good solubility in a low boiling solvent of choice in preparing precatalyzed epoxy resin compositions useful in making ultimately cured epoxy resin coatings of superior properties.

The resins produced using the instant catalysts exhibit good color (Gardner Color readings of <3) and high clarity as evidence in 40% N.V. resin solutions in butyl carbitol.

The advanced high molecular weight products are utilized in conjunction with curing agents to prepare surface coatings of excellent quality that is possessing enhanced adhesion, flexibility and chemical resistance to solvents, acids and alkalis.

The advanced products of lower molecular weight find utility in laminating, filament winding and structural applications particularly when they are derived from brominated phenols.

The polyepoxides are those possessing more than one vicepoxy group, i.e., more than one

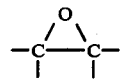

group; which group may be a terminal group, i.e.,

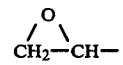

or may be in an internal position.

The polyepoxides may be saturated or unsaturated aliphatic, cycloaliphatic, aromatic or heterocyclic and may be substituted with substituents, such as chlorine, hydroxyl group, ether radicals and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)-diphenyl ether, 1,8-bis(2,3-epoxypropoxy)octane, 1,4-bis(2,3-epoxypropoxy)cyclohexane, 2,2-[4,4'-bis(2-hydroxy-3,4-epoxybutoxy)diphenyl]propane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol or polynuclear phenols, such as 2,2-bis(4-hydroxyphenol)propane (bisphenol A), 2,2-bis(4-hydroxyphenol)butane, 4,4'-dihydroxybenzophenone, bis-(4-hydroxyphenoxy)ethane, 2,2-bis(4-hydroxyphenyl)pentane and 1,5-dihydroxynaphthalene. The halogen-containing epoxides may be further exemplified by 3-chloro-2,3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. Pat. No. 2,633,458.

A preferred group of the above described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. Pat. No. 2,633,458 as Polyethers A, B, C and D.

Another group of polyepoxides comprises the polyepoxy polyethers obtained by reacting, preferably in the presence of an acid-acting compound, such as hydrochloric acid, or of the aforedescribed halogen-containing epoxides such as epichlorohydrin, with a polyhydric alcohol, and subsequently treating the resulting product with an alkaline component. As used herein the expressions "polyhydric alcohol" is meant to include those compounds having at least two free alcoholic OH groups and includes the polyhydric alcohols and their ethers and esters, hydroxy-aldehydes, hydroxy-ketones; halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, mesitol, trimethylolpropane, 2,2-[bis(4-hydroxycyclohexyl)]propane and the like.

The preparation of suitable polyepoxide polyethers is illustrated in U.S. Pat. No. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy functionality greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, ethyl eleostearate, monoglycerides of tung oil fatty acids, monoglycerides of soybean oil, sunflower, tapeseed, hempseed, sardine, cottonseed oil and the like.

Another group of the epoxy-containing materials having internal epoxy groups include the epoxidized esters of unsaturated alcohols having the ethylenic group in an internal position and polycarboxylic acids, such as for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5-epoxydodecyl)maleate, di(2,3 epoxybutyl)terephthalate, di(2,3-epoxypentyl)thiopropionate, di(2,3-epoxyhexyl)-succinate, di(2,3-epoxyoctyl)tetrahydrophthalate, di(4,5-epoxydodecyl)maleate, di(2,3-epoxybutyl)-terephthalate, di(2,3-epoxypentyl)thiopropionate, di(2,3-epoxybutyl)citrate and di(4,5-epoxyoctadecyl)-malonate, as well as the esters of epoxycyclohexanol and epoxycyclohexylalkanols, such as for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4 epoxyhexyl 3,4 epoxypentanoate, 3,4-epoxycyclohexyl 3,4-cyclohexanone, 2,3-epoxycyclohexylmethyl, 2,3-epoxycyclohexanoate, and 3,4-epoxycyclohexyl 4,5-epoxyoctanoate, and the like.

Another group of materials having internal epoxy groups includes epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanonate).

Still another group of the epoxy compounds having internal epoxy groups include epoxidized derivative of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl-8,9,12,13-diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl 5,6,10,11-diepoxyoctadecylsuccinate.

In the process of the invention, the proportion of catalyst used is preferably between 0.005 and 1% by weight, and advantageously between 0.01 and 0.5% by weight, calculated on the total weight of the reactants.

The process of the invention may be carried out in the melt or in the presence of a solvent. If solid or highly viscous reactants are used and/or highly viscous products are formed, the presence of inert solvents may be of advantage. Examples of inert solvents which may be used are xylene, toluene, methyl isobutyl ketone, ethylene glycol diethyl ether and dibutyl ether.

The novel catalysts of this invention formylmethylenetriphenylphosphorane and formylmethyltriphenylphosphonium chloride are items of commerce.

The following examples further illustrate the nature of the instant invention, but are not to be construed as limiting the scope thereof.

EXAMPLE 1

To a three-necked, round-bottomed 1-liter flask equipped with a mechanical stirrer, nitrogen inlet tube, thermometer and reflux condenser was charged and thoroughly mixed 500 grams of 2,2-bis[p-(glycidyloxy)-phenyl]propane, ARALDITE 6010, commercial diglycidyl ether of bisphenol A, epoxy content 0.531 eq/100 g, 267.5 grams of 4,4'-isopropylidenediphenol (bisphenol A), and 0.5 gram (100 ppm, based on liquid epoxy resin) of formylmethylenetriphenylphosphorane, $(C_6H_5)_3P{=}CHCHO$.

The reaction mixture was agitated and heated under nitrogen to 130° C. The external heat source was then turned off. An exothermic reaction ensued driving the temperature to a peak of about 190° C.

The stirred reaction mixture was then held at 195° C. for a period of 1.5 hours. The resultant advanced resin had an epoxy content of 0.040 eq./100 g and a Gardner-Holdt viscosity of $Z_2$ at 25° C.

This advanced resin was then further heated in an oven at 195° C. for another 2 hours. The resin after this period had an epoxy content of 0.039 eq/100 g and a Gardner-Holdt viscosity of $Z_2$-$Z_3$.

The calculated epoxy content value for this advanced resin is 0.040 eq/100 g.

An epoxy value above 0.040 eq/100 g means incomplete advancement and a value below 0.040 eq/100 g indicates that the secondary hydroxyl groups present are participating in a further reaction with the epoxy groups and that branching is beginning to occur.

EXAMPLE 2

The general procedure of Example 1 was repeated except that 0.5 gram (1000 ppm, based on epoxy resin) of formylmethyltriphenylphosphonium chloride was used as advancement catalyst instead of formylmethylenetriphenylphosphorane. The exothermic reaction gave a temperature of 175° C.

The stirred reaction mixture was then held at 195° C. for 1 hour. The resultant advanced resin had an epoxy content of 0.040 eq/100 g and a Gardner-Holdt viscosity of $Z_2$ at 25° C.

The advanced resin was then further heated in an oven at 195° C. for another 2 hours. The resin after this heating period still had an epoxy content of 0.040 eq/100 g and gave a Gardner-Holdt viscosity of $Z_2$ at 25° C.

The properties exhibited by the advanced resins of Examples 1 and 2 show high selectivity of the instant catalysts to give advanced resin with good stability at 195° C. The epoxy content value stayed essentially constant after heating for 2 hours at 195° C. with only a minor increase in viscosity as measure by the Gardner-Holdt method.

EXAMPLES 3–11

The general procedure of Example 1 was used within the same liquid epoxy resin, but with a variety of phosphorane or phosphonium halide catalysts. The results of these advancement reactions are given in Table A.

TABLE A

| Ex. | Catalyst[a] | Init Heat to °C. | Exotherm °C. | Heat at 195° for hours | Epoxy Content Advanced Resin eq/100 g after adv. | Epoxy Content Advanced Resin eq/100 g after oven heat | Gardner-Holdt viscosity at 25° C. after adv. | Gardner-Holdt viscosity at 25° C. after oven heat |
|---|---|---|---|---|---|---|---|---|
| 1 | $(C_6H_5)_3P=CHCHO$ | 130 | 190 | 1.5 | 0.040 | 0.039 | $Z_2$ | $Z_2-Z_3$ |
| 2 | $(C_6H_5)_3P^+CH_2CHOCl^-$ | 130 | 175 | 1 | 0.040 | 0.040 | $Z_2$ | $Z_2$ |
| 3 | $(C_6H_5)_3P=CHCOC_6H_5$ | 130 | 163 | 3 | 0.040 | 0.039 | $Z_3-Z_4$ | $Z_4$ |
| 4 | $(C_6H_5)_3P=CHCOCH_3$ | 135 | 195 | 4 | 0.038 | 0.038 | $Z_2-Z_3$ | $Z_2-Z_3$ |
| 5 | $(C_6H_5)_3P^+CH_2COC_6H_5Br^{-[b]}$ | 195 | none | 3 | 0.038 | $0.029^c$ | $Z_3-Z_4$ | $Z_6-Z_7{}^c$ |
| 6 | $(C_6H_5)_3P^+CH_2COOCH_3Br^-$ | 180 | 191 | 2¼ | 0.043 | 0.042 | $Z_1-Z_2{}^d$ | $Z_2-Z_3$ |
| 7 | $(C_6H_5)_3P=CHCOOC_2H_5$ | 195 | none | 2 | 0.039 | $0.037^c$ | $Z_3$ | $Z_5-Z_6{}^c$ |
| 8 | $(C_6H_5)_3P=CHCOOCH_3$ | 160 | 180 | 1.5 | 0.040 | 0.032 | $Z_4-Z_5$ | $Z_5-Z_6{}^c$ |
| 9 | $(C_6H_5)_3P^+CH_2COOC_2H_5Br^-$ | 195 | none | 4.5 | 0.046 | — | $Z_3$ | — |
| 10 | $(C_6H_5)_3P^+C_2H_5I^-$ | 130 | 181 | ⅞ | 0.039 | 0.037 | $Z_2-Z_3$ | $Z_2-Z_3$ |
| 11 | $(C_6H_5)_3P^+C_2H_5OAC^-\cdot HOAC$ | 127 | 197 | 1.5 | 0.040 | 0.040 | $Z_2$ | $Z_2$ | a. Catalysts are:
Ex 1: formylmethylenetriphenylphosphorane
Ex 2: formylmethyltriphenylphosphonium chloride
Ex 3: benzoylmethylenetriphenylphosphorane
Ex 4: acetylmethylenetriphenylphosphorane
Ex 5: phenacyltriphenylphosphonium bromide
Ex 6: methoxycarbonylmethylphosphonium bromide
Ex 7: Ethyl triphenylphosphoranylideneacetate
Ex 8: Methyl triphenylphosphoranylideneacetate
Ex 9: Ethoxycarbonylmethyltriphenylphosphonium bromide
Ex 10: Ethyltriphenylphosphonium iodide
Ex 11: Ethyltriphenylphosphonium acetate-acetic acid complex b. Only 200 ppm of catalyst was used.

c. Gardner-Holdt viscosity values for these advanced resins heated in the oven for 2 hours at 195° C. were excessively high indicating some branching had begun. Epoxy content values were also below the desired range of 0.038–0.040 for this advanced resin.

d. Gardner-Holdt viscosity values and corresponding high epoxy content value of 0.043 eq/100 g indicate that the advancement reaction is not complete.

Review of the data listed in Table A confirms the superiority of the instant formylmethylenetriphenylphosphorane and formylmethyltriphenylphosphonium chloride as advancement catalysts for epoxy resins compared to the various prior art phosphoranes and phosphonium salts tested in terms of a rapid advancement reaction and high selectivity.

These properties are exhibited below in Examples 1 and 2 where it can be seen that rapid advancement reaction (about two hours or less) are displayed coupled with good advanced resin stability at 195° C. indicative of high selectivity. The advanced resins are high molecular weight solids (so-called "9"-type resins) characterized by terminal epoxide contents of preferably 0.038–0.040 eq/100 g and Gardner-Holdt viscosities of $Z_2-Z_5$ (preferably $Z_2-Z_4$) at 25° C.

An epoxide content of 0.040 eq./100 g. is the theoretical value for the "9"-type resins studies.

In Examples 3 and 4 are shown the properties of epoxy resins obtained by catalysis with benzoylmethylenetriphenylphosphorane and acetylmethylenetriphenylphosphorane which are specifically revealed in British Pat. No. 1,398,197.

Comparison of the data obtained from the above-mentioned phosphoranes with formylmethylenetriphenylphosphorane supports the superiority of the latter in catalysis of epoxy resin advancement.

The exothermic profile and rapid reaction with the formylmethylenetriphenylphosphorane is evident as is the good selectivity as measured by the relative stability in the epoxy content and viscosity of the oven-aged sample of advanced resin.

By contrast, reaction times encountered with the benzoyl and acetyl substituted phosphoranes were from two to almost three times longer (up to 4 hours) although the selectivities were comparable to that of the formylmethylenetriphenylphosphorane.

British Pat. No. 1,398,197 indicates that the phosphoranes disclosed therein are effective catalysts for advancing epoxy resins, but reaction times were stipulated as 4–6 hours at 170° C. for advanced resins generally possessing final epoxy contents of 0.2–0.3 eq./100 g., and viscosities (Gardner-Holdt) of 80–800 cP. at 25° C. Such viscosities are characteristic of low molecular weight epoxy resins. Examples 5 and 6 exhibited data obtained by catalysis of epoxy resin advancement with phenacyltriphenylphosphonium bromide and methoxycarbonylmethylphosphonium bromide.

Comparison of the data substantiates the unexpected finding that the phosphonium halide salt based on the formyl substituted hydrocarbon moiety surpasses analogous compounds containing phenacyl and acetyl substitution of a hydrocarbon radical in functioning as an effective catalyst for epoxy resin advancement. This can be seen in the reaction times at 195° C. and the change in resin viscosities on heating the respective samples at the elevated temperature (195° C.) beyond the final theoretical epoxy content of the advanced resin.

Thus, the catalysts of the present invention provide superior systems for converting liquid epoxy resins containing more than one 1,2 epoxide group to solid, high molecular weight polyhydroxyethers.

Examples 7–9 demonstrate that these phosphorane and phosphonium bromide catalysts are ineffective as advancement catalysts for the "9" type epoxy resin with poor selectivity and/or excessively slow reaction rate.

Examples 10–11 show that these two prior art catalysts are essentially equivalent to the instant catalysts in respect to selectivity and reactivity in advancing a liquid epoxy resin under these reaction conditions.

EXAMPLES 12–15

An aliquot portion of the well-mixed precatalyzed composition comprising (a) 1000 grams of 2,2-bis[p-(glycidyloxy)phenyl]propane, and (b) 1.0 gram of catalyst was stored in a sealed container at 50° C. for five weeks. At the end of that period, the epoxy content and viscosity values were run on each sample to indicate the inertness of the advancement catalyst toward premature advancement of the epoxy resin under 50° C. storage conditions. The data are given on the table below.

| Storage Stability of Precatalyzed Liquid Epoxy Resin at 50° C.[a] | | | | |
|---|---|---|---|---|
| Example | 12 | 13 | 14 | 15 |
| Catalyst[b] | A | B | C | D |
| Epoxy Value eg/100 g | | | | |
| Initial | 0.522 | 0.523 | 0.521 | 0.521 |
| After 5 weeks storage at 50° C. | 0.518 | 0.056 | 0.512 | 0.518 |
| Viscosity (centipoises) at 25° C. | | | | |
| Initial | 15,527 | 15,026 | 15,986 | 15,280 |
| After 5 weeks storage at 50° C. | 21,328 | 35,478 | 27,904 | 27,944 | a. liquid resin is 2,2-bis[p-(glycidyloxy)-phenyl]propane, ARALDITE 6010.
b. Catalysts are:
A. Ethyltriphenylphosphonium iodide
B. Ethyltriphenylphosphonium acetate-acetic acid complex
C. Formylmethyltriphenylphosphonium chloride
D. Formylmethylenetriphenylphosphorane The instant catalysts of Examples 14–15 provide far more storage stability than the catalyst of Example 13. The catalyst of Example 12 provides the most stable precatalyzed solutions.

EXAMPLE 16–21

Under reaction conditions where the advancement reaction was initiated under moderate temperatures (about 130° C.) and where the size (volume) of the exotherming mass was sufficiently small to prevent the exotherm temperature from exceeding 195°–200° C., the instant catalysts of Examples 1 and 2 and the prior art catalysts of Examples 10 and 11 all exhibited essentially equivalent behavior in respect to selectivity and reactivity in advancing a liquid epoxy resin.

However, when the advancement reaction was initiated at higher temperatures (150° C.) or where the size (volume) of the exotherming mass was sufficiently large to allow the exotherm temperature to exceed 195°–200° C., the instant compound of Example 2 was surprisingly more effective as a catalyst for the advancement reaction than either prior art compound of Example 10 or 11. The higher temperatures (200° C. plus) appear to deactivate said prior art compounds substantially reducing their reactivity and/or selectivity as catalysts in advancing a liquid epoxy resin.

When the batch size of Example 1 was doubled as in the following procedure, these results were obtained.

To a three-necked, round-bottomed 2-liter flask equipped with a stirrer, thermometer and nitrogen inlet were charged 1000 grams of 2,2-bis[p-(glycidyloxy)-phenyl]propane, ARALDITE 6010, commercial diglycidyl ether of bisphenol A, epoxy content 0.531 eq/100 g, 534 grams of 4,4'-isopropylidenediphenol (bisphenol A) and 1.0 gram (1000 ppm, based on liquid epoxy resin) of catalyst. The reaction mixture was heated to 130° C. under nitrogen with agitation. The external heat source was then turned off and the reaction mixture was allowed to exotherm. When the exotherm was concluded, the temperature of the reaction mixture was then set and held at 195° C. Samples were taken of the reaction mixture at 1 hour intervals thereafter to monitor the course of the advancement reaction over a 4-hour period. The results of said monitoring are given in the table below.

| Example[a] | Maximum Exotherm °C. | Reaction Time Hours | Epoxy Content[b] Reaction Mixture eg/100 g |
|---|---|---|---|
| 16 | 198 | 1 | 0.046 |
| | | 2 | 0.044 |
| | | 3 | 0.042 |
| | | 4 | 0.039 |
| 17 | 230 | 1 | 0.058 |
| | | 2 | 0.055 |
| | | 3 | 0.052 |
| | | 4 | 0.050 |
| 18 | 212 | 1 | 0.046 |
| | | 2 | 0.045 |
| | | 3 | 0.039 |
| | | 4 | 0.037 |

[a]Catalyst is
16 - formylmethyltriphenylphosphonium chloride
17 - ethyltriphenylphosphonium iodide
18 - ethyltriphenylphosphonium acetate-acetic acid complex
[b]Calculated final epoxy content should be 0.040 eg/100 g.

Examples 16–18 show that ethyltriphenylphosphonium iodide is badly deactivated by high temperature; that the ethyltriphenylphosphonium acetate-acetic acid complex suffers a loss in selectivity under these reaction conditions with the epoxy content indicating that some branching may be occurring; and that the instant catalyst of Example 16 resists deactivation and still exhibits a highly desired balance of catalytic properties not shown by either of the prior art compounds.

Using the same three catalysts and the same exact procedure as given for Examples 16–18 except that the reaction mixtures were each heated to 150° C. to initiate the advancement reaction, the following results were obtained on monitoring the reaction mixtures as was described for Examples 16–18.

| Example[a] | Maximum Exotherm °C. | Reaction Time Hours | Epoxy Content[b] Reaction Mixture eg/100 g |
|---|---|---|---|
| 19 | 209 | 1 | 0.042 |
| | | 2 | 0.040 |
| | | 3 | 0.040 |
| | | 4 | 0.040 |
| 20 | 210 | 1 | 0.048 |
| | | 2 | 0.045 |
| | | 3 | 0.043 |
| | | 4 | 0.041 |
| 21 | 225 | 1 | 0.054 |
| | | 2 | 0.053 |
| | | 3 | 0.053 |
| | | 4 | 0.048 |

[a]Catalyst is
19 - formylmethyltriphenylphosphonium chloride
20 - ethyltriphenylphosphonium iodide
21 - ethyltriphenylphosphonium acetate-acetic acid complex
[b]Calculated final epoxy content should be 0.040 eg/100 g.

The results of Examples 19–21 are even more dramatic in distinguishing the instant compound of Example 19 over the two prior art compounds of Examples 20 and 21 as advancement catalysts for liquid epoxy resins. Example 21 shows that the ethyltriphenylphosphonium acetate-acetic acid complex is particularly deactivated by high temperature and that under the conditions of Example 21 it exhibits limited catalytic effects. Example 20 shows that ethyltriphenylphosphonium iodide is a much weaker catalyst after deactivation by exposure to an exotherm temperature of only 210° C. Although still exhibiting catalytic activity, even after four hours reaction time, it had not brought the advancement of the liquid epoxy resin to completion.

Example 19 demonstrates that the instant compound formylmethyltriphenylphosphonium chloride is an excellent catalyst both in terms of reactivity and selectivity even after exposure to an exotherm temperature of 209° C. Complete and selective advancement of the liquid epoxy resin was achieved in only two hours.

Utilization of the instant catalysts especially under these higher reaction initiation temperatures (about 150° C.) would provide obvious concomitant economic benefits not presently available with use of the prior art catalysts. Much faster advancement reaction times are now possible with use of the new instant catalysts.

What is claimed is:

1. A precatalyzed epoxy resin composition which comprises
    (a) a liquid epoxy resin bearing an average of more than one vicinal epoxy group per molecule, and
    (b) a small, but effective catalytic amount of formylmethylenetriphenylphosphorane or formylmethyltriphenylphosphonium halide.

2. A composition according to claim 1 wherein component (b) is formylmethylenetriphenylphosphorane or formylmethyltriphenylphosphonium chloride.

3. A composition according to claim 1 which additionally comprises (c) a bisphenol, with (b) being present in an amount sufficient to catalyze the advancement reaction between (a) and (c) when the reaction mixture is heated to a temperature of from about 50° C. to about 225° C.

4. A compositon according to claim 1 wherein (a) is the diglycidyl ether of 4,4'-isopropylidenediphenol.

5. A composition according to claim 3 wherein (c) is 4,4'-isopropylidenediphenol.

6. An improved process for advancing a liquid epoxy resin bearing at least one vicinal epoxy group with a polyphenol to form a solid, essentially linear resin at about 50° C. to about 225° C. wherein the improvement comprises
    carrying out the advancement reaction in the presence of a small, but effective catalytic amount of formylmethylene triphenylphosphorane or formylmethyltriphenylphosphonium halide.

7. A process according to claim 6 wherein the halide is formylmethyltriphenylphosphonium chloride.

8. A process according to claim 6 wherein the epoxy resin is 2,2-bis[p-(glycidyloxy)phenyl]propane and the bisphenol is 4,4'-isopropylidenediphenol.

* * * * *